United States

Mottier et al.

[11] 3,914,056
[45] Oct. 21, 1975

[54] APPARATUS FOR EVALUATING HOLOGRAPHICALLY RECONSTRUCTED WAVE FIELDS WITH TWO FREQUENCIES

[75] Inventors: Francois M. Mottier; Rene Dandliker, both of Oberrohrdorf, Switzerland

[73] Assignee: BBC Brown, Boveri & Company, Limited, Baden, Switzerland

[22] Filed: Jan. 21, 1974

[21] Appl. No.: 435,215

[30] Foreign Application Priority Data
Feb. 14, 1973  Switzerland.......................... 2010/73

[52] U.S. Cl.................................. 356/109; 350/3.5
[51] Int. Cl.²........................................... G01B 9/02
[58] Field of Search .............. 356/106, 109; 350/3.5

[56] References Cited
UNITED STATES PATENTS
3,627,426  12/1971  Tsuruta et al....................... 356/109
3,767,307  10/1973  Bowker............................... 356/109

Primary Examiner—Ronald L. Wibert
Assistant Examiner—Conrad J. Clark
Attorney, Agent, or Firm—Oblon, Fisher, Spivak, McClelland, & Maier

[57] ABSTRACT

Apparatus for evaluating the reconstruction of holographically recorded wave fields wherein the same spatial arrangement of the reconstructing apparatus with respect to the recording medium and the reference waves is utilized as in the recording process. The frequencies of the reference waves utilized during reconstruction are different than those used during recording. A geometric-optic arrangement focuses the reconstructed wave field in an image plane which is scanned by optoelectronic detection means. The undulating light signal produced in the image plane has a carrier frequency equal to the beat frequency between the frequencies of the reference waves utilized during reconstruction, and has a phase directly proportional to the depth of the object point under observation in the image plane.

6 Claims, 3 Drawing Figures

APPARATUS FOR EVALUATING HOLOGRAPHICALLY RECONSTRUCTED WAVE FIELDS WITH TWO FREQUENCIES

BACKGROUND OF THE INVENTION

1. Field of the Invention:

The present invention relates to apparatus for evaluating the reconstruction of holographically recorded wave fields, and more particularly to those wave fields produced by the scattering of a collinear light beam with two optical frequencies $\omega_1$ and $\omega_2$ from an object under study and holographically recorded with reference waves of the same frequencies $\omega_1$ and $\omega_2$, where $|\omega_1 - \omega_2| > 1 \text{GHz}$.

2. Description of the Prior Art:

It is known in the art (see e.g. Appl. Phys. Lett. 15 (1 July 1969) No. 1, p. 28–30) that in the hologram reconstruction of an object recorded with a laser operating at two frequencies $\omega_1$ and $\omega_2$ with a difference frequency $|\omega_1 - \omega_2|$ greater than 1 GHz, the image of the object exhibits dark stripes, the distance between which is proportional to the depth of the object in the direction of the bisector of the angle between the direction of the illuminating beam and the direction of observation. The image of the object is therefore overlaid with what is known as "depth contours."

SUMMARY OF THE INVENTION

It is a primary object of the present invention to provide a new and improved apparatus for evaluating holographically reconstructed wave fields with two frequencies by means of which the depth of the holographically recorded object can be easily and precisely determined from its depth contours.

Another object of the present invention is to provide an apparatus for evaluating holographically reconstructed wave fields wherein an undulating light signal is produced in an image plane, the frequency and phase of which may be processed by conventional optoelectronic detectors to yield a direct measure of the depth of the observed object point.

An additional object of the present invention is to provide an apparatus for evaluating holographically reconstructed wave fields wherein reference waves for reconstruction emanate from the same collimated light beam to minimize disturbance of the reconstructed object by conjugate waves, reference waves, and crossmodulation terms.

The foregoing and other objects are attained in accordance with one aspect of the present invention by establishing the same spatial arrangement of the reconstructing apparatus with respect to the recording medium and the reference waves as in the recording process. This is, the reconstructing apparatus is oriented in such a way that there are two separate reference waves inclined to the wave field scattered at the object and incident on the holographic recording medium. These reference waves are not however of the frequencies $\omega_1$ and $\omega_2$ used in taking the hologram, but are of the optical frequencies $\omega_1'$ and $\omega_2'$ with a difference frequency between zero and 1 GHz. A geometric-optic arrangement focuses the thus reconstructed wave field in an image plane which can be scanned by an optoelectronic detector capable of evaluating the undulating light signal in the image plane, including its phase.

The present invention utilizes the principle that bringing together the two frequencies $\omega_1'$ and $\omega_2'$ at a point P of the image plane E produces an undulating light signal I(P,t) with a carrier frequency $\Omega = \omega_1' - \omega_2'$ and with phase $\Psi$ (P) directly proportional to the depth Z of the object point imaged in the point P. Since, in accordance with the present invention, $\Omega$ is preferably < 1GHz, e.g. 10 kHz, the signal I(P,t) is easily handled by conventional phase detectors and the phase $\Psi$ (P) can be obtained as a function of the location P in the image plane E.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1A:
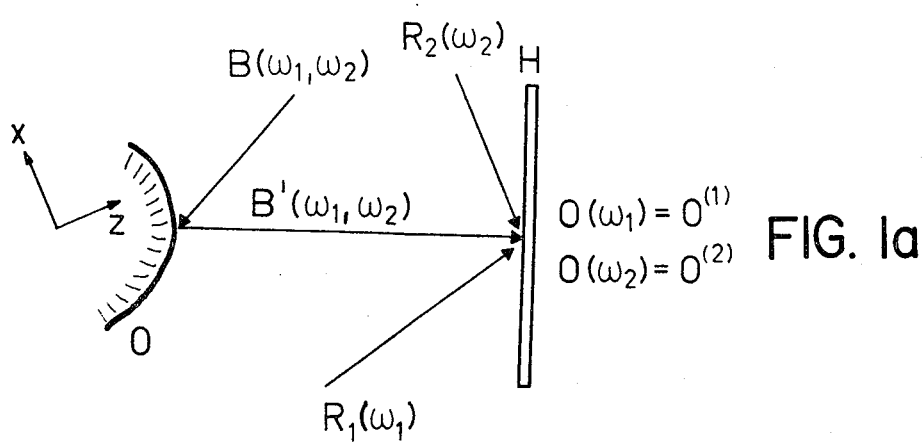
FIGS. 1a and b are diagrams of a preferred embodiment of the present invention utilizing a single holographic recording medium and two reference waves inclined to each other.

Referring now to the drawings, wherein like reference numerals designate identical or corresponding parts throughout the several views, and more particularly to FIG. 1a thereof, an object O is illuminated by a light beam B of two discrete, different frequencies $\omega_1$ and $\omega_2$. The light beam B can be conceived as consisting of two collinear, collimated or divergent light waves of frequencies $\omega_1$ and $\omega_2$ emanating from the same laser. Light beam B can also be interpreted as comprising a wave field of coherence length $l_{coh} = c/(\omega_1 - \omega_2)$, the coherence length being relatively small since the invention requires $|\omega_1 - \omega_2| $ 1 GHz.

The wave field B' ($\omega_1$, $\omega_2$) is seen to travel from the object O to the holographic recording medium H, i.e. a photographic plate, a film, a thermoplastic substrate or the like. The wave field B' similarly contains the frequencies $\omega_1$ and $\omega_2$, and can also be interpreted as described above with respect to light beam B.

B' is holographically recorded on hologram H by means of the reference waves $R_1$ ($\omega_1$) and $R_2$ ($\omega_2$) inclined to one another and to B'. $R_1$ is of the same frequency $\omega_1$ contained in B and $R_2$ is of the other frequency $\omega_2$. In this manner, the scattered wave field B' ($\omega_1$) for the frequency $\omega_1$ is recorded independently of the other wave field B' ($\omega_2$) for the frequency $\omega_2$. The part recorded for frequency $\omega_1$ is denoted by O ($\omega_1$) = $O^{(1)}$ and that for $\omega_2$ by O ($\omega_2$) = $O^{(2)}$.

Further, there are introduced coordinate axes x and z of which z is in the direction of the bisector of the angle between B and B', as seen in FIG. 1a).

Figure 1B:
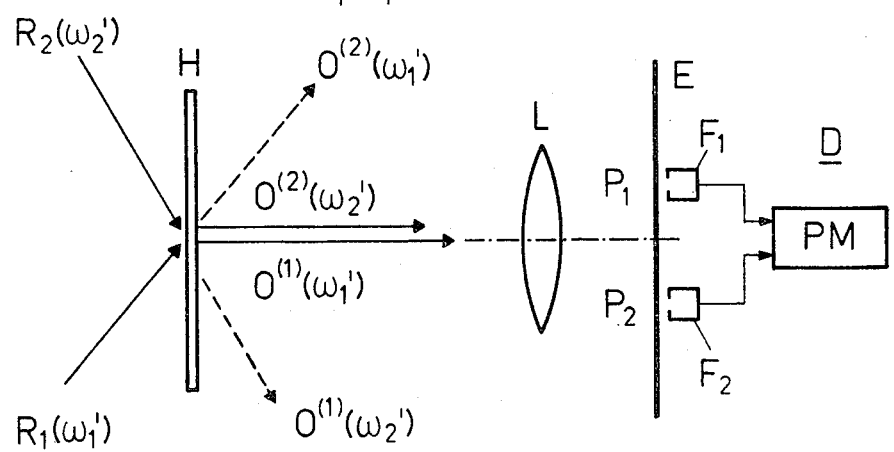

Referring now to FIG. 1b), an arrangement spatially identical to that of the recording process is presented wherein the reference waves $R_1$ ($\omega_1'$ ) and $R_2$ ($\omega_2'$ ) illuminate the recording medium H. Here $\omega_1'$ and $\omega_2'$ represent optical frequencies, i.e. definitely greater than $6 \times 10^{12}$ Hz ($\lambda \approx 50$ $\mu$), e.g. $6.5 \times 10^{14}$ Hz(Ar-Laser), and their difference frequency $|\omega_1' - \omega_2'|$ is constant and smaller than 1 GHz, e.g. 10 kHz.

The optical frequencies $\omega'_1$ and $\omega'_2$ can be produced in a known manner by e.g. mechano-optical modulation (illumination of a rotating lattice) of a laser beam. However, use can also be made of a Zeemann-laser (see e.g. "Laser," Kleen and Muller, Springer 1969, p. 274 ff.) which simultaneously emits two different frequencies of opposite circular polarizations, so that they are separable, for example, by $\lambda/4$-plates and polarizers. The difference between the two frequencies can vary approximately between 10 and 100 MHz.

The recorded wave fields $O^{(1)}$ and $O^{(2)}$ are reconstructed with the reference waves $R_1$ ($\omega'_1$) and $R_2$ ($\omega'_2$) and are focused in the image plane E by means of a lens system L. However, they now exhibit the frequencies $\omega'_1$ and $\omega'_2$.

The depth-contour lines are no longer stationary but wander over the image plane E. An optoelectronic detector D with two primary elements $F_1$ and $F_2$, which may comprise e.g. photodiodes, is placed in the image plane E. Detector D will detect a fluctuating signal I (P,t) which at point P of the image plane can be described as follows:

$$I(P,t) \sim a + b \cos[(\omega'_1 - \omega'_2)t + \Psi]$$

where $$\Psi \sim \frac{\omega_1 - \omega_2}{c} Z(P).$$

Letters $a$ and $b$ denote constants while $Z(P)$ represents the depth $Z$ of the object point corresponding to the image point P at which the fluctuating signal is sensed.

Accordingly, I(P,t) is a signal processable by known high-frequency techniques and its phase $\Psi$ is a direct measure of the depth of the observed object point.

As a further refinement of the first embodiment, of the two primary elements $F_1$ and $F_2$, $F_1$ is made to be fixed in position while $F_2$ is made movable over the image plane E. $F_1$ will then measure a referennce phase $\Psi(P_1) \sim \omega_1 - \omega_2/c \, Z(P_1)$ and $F_2$ will measure a phase $\Psi(P_2) \sim \omega_1 - \omega_2/c \, Z(P_2)$. The difference in phases $\Psi(P_1) - \Psi(P_2)$ will yield directly the difference in the depths of points $P_1$ and $P_2$. The result is a very high resolution ($10\mu$) contour map of the observed object. Obviously $\Psi$ changes faster with Z, i.e. the resolution is better for increasing values of $\omega_1 - \omega_2$. It is useless, however, to employ too large a value of $|\omega_1 - \omega_2|$ since the contour lines ($\Psi$ changes by $2\pi$) then squeeze so close together than the elements $F_1$ and $F_2$ can no longer resolve them. For example, when $\omega_1 - \omega_2 \approx$ 1GHz the contour lines are about 15 cm apart, but at 10 GHz the contour line are only 15 mm apart.

The additional wave fields $O^{(1)}$ ($\omega'_2$) and $O^{(2)}$ ($\omega'_1$) depicted in FIG. 1b) are cross-modulation terms, i.e. wave fields produced in the reconstruction of the recorded wave fields $O^{(1)}$ and $O^{(2)}$ with the "false" reference waves $R_2(\omega'_2)$ and $R_1(\omega'_1)$. It is clear that the inclination of the directions of B', $R_1$ and $R_2$ must be so chosen that the superimposed wave fields $O^{(1)}$ ($\omega'_1$) and $O^{(2)}$ ($\omega'_2$) are not disturbed by the cross-modulation terms, the reference waves and the conjugate object waves.

Figure 2:
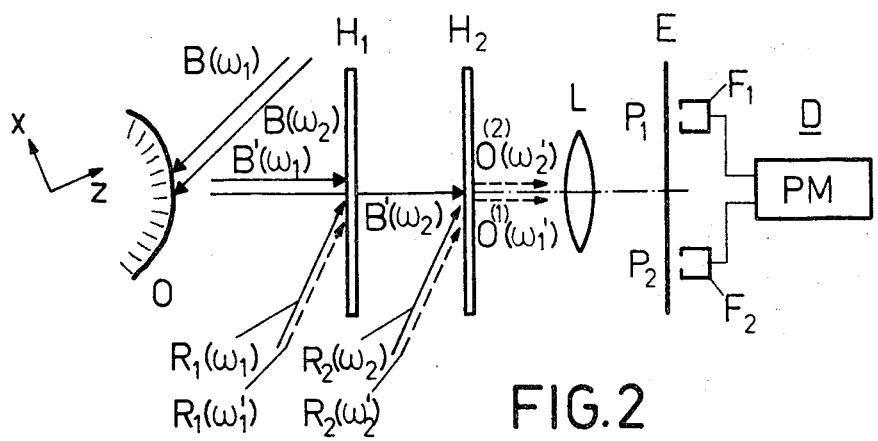
FIG. 2 is a diagram of an alterative preferred embodiment of the present invention utilizing a two-part holographic recording medium and two parallel reference waves.

Referring now to FIG. 2, it is seen that the second embodiment depicted therein differs from that shown in FIG. 1 in that the wave field $B'(\omega_1)$ is recorded by means of the reference wave $R_1(\omega_1)$ on a first recording part $H_1$, e.g. a photographic plate, and the wave field $B'(\omega_2)$ is recorded by means of the reference wave $R_2(\omega_2)$ on a recording part $H_2$. The wave B' ($\omega_2$) passing through $H_1$, and the wave B' ($\omega_1$) impinging on $H_1$, are essentially non-interfering since they are not coherent with the recording reference waves $R_2(\omega_2)$ and $R_1$ ($\omega_1$), respectively. It may however also occur that in the first place only the object O and recording part $H_1$ are illuminated by $B(\omega_1)$ and R ($\omega_1$), and then only the object O and recording part $H_2$ are illuminated by $B(\omega_2)$ and $R(\omega_2)$.

In the reconstruction, reference waves $R_1(\omega'_1)$ and $R_2(\omega'_2)$ are spatially identical to those used in recording. Thus, the same wave fields $O^{(1)}(\omega'_1)$ and $O^{(2)}(\omega'_2)$ result behind $H_2$ as in FIG. 1 so that the evaluation may proceed in the same manner.

One particular advantage of the embodiment shown in FIG. 2 is that reference waves from the same collimated light beam, for example through mechanical apertures, can be utilized. This makes the arrangement far less critical than that shown in FIG. 1 with respect to disturbance of the reconstructed object by conjugate waves, reference waves and cross-modulation terms.

Several detector elements in a variety of configurations and with several phase meters can also be provided in other aspects of the present invention. Thereby, if needed, the gradient components of the contour lines obtained, i.e. the derivatives of the phase $\Psi$ with respect to the coordinates, can be easily determined. The foregoing is described in detail in applicant's two copending patent application. "Apparatus for Evaluating Holographic Interferograms" U.S. Ser. No. 429,885, filed Jan. 2, 1974, to which reference is made.

A conventional x-y recorder may be connected to the optoelectronic detector D. A profile of the visible surface at any desired section through the object, i.e. z as function of x in the image plane E, may be drawn on such a recorder directly with high accuracy ($\Delta z \approx$ 0.1 mm).

Obviously, numerous modifications and variations of the present invention are possible in light of the above teachings. It is therefore to be understood that within the scope of the appended claims the invention may be practiced otherwise than as specifically descriibied herein.

What is claimed as new and desired to be secured by Letters patent of the United States is:

1. Apparatus for evaluating the reconstruction of holographically recorded wave fields produced by the scattering of a collinear illuminating beam of two optical frequencies $\omega_1$ and $\omega_2$ at a test object and holographically recorded by means of two reference waves of the frequencies $\omega_1$ and $\omega_2$ respectively, wherein $|\omega_1 - \omega_2| > 1$ GHz., which comprises:

means for providing during recording at said hologram two spatially separate reference waves inclined to said wave field scattered at said object and impinging on a holographic recording medium, wherein the reference waves for reconstructing said wave fields are oriented with respect to said recording medium identically to their spatial orientation during said recording process and are of frequencies $\omega'_1$ and $\omega'_2$, respectively, and wherein the difference between $\omega'_1$ and $\omega'_2$ is between zero and 1 GHz.;

geometric-optical means for focusing the reconstructed wave fields in an image plane; and optoelectronic detector means for scanning said image plane to evaluate the fluctuating light signal and its phase in said image plane.

2. The apparatus for evaluating the reconstruction of holographically recorded wave fields according to claim 1, further comprising:

means for providing in the recording process an illuminating beam containing the frequencies $\omega_1$ and $\omega_2$ which impinges on said object;

a first holographic recording medium; and means for providing two reference waves of said frequencies $\omega_1$ and $\omega_2$, respectively, inclined to the wave field scattered at said object and inclined to each other.

3. The apparatus for evaluating the reconstruction of holographically recorded wave fields according to claim 1, further comprising:

means for providing during said recording process two collinear illuminating beams containing the frequencies $\omega_1$ and $\omega_2$ for impinging on said object;

first and second holographic recording mediums disposed one behind the other in the direction of observation; and means for providing said two reference waves parallel to one another and inclined to the wave field scattered at the object, each of said reference waves impinging on one of said mediums.

4. A method for evaluating the reconstruction of holographically recorded wave fields produced by the scattering of a collinear illuminating beam of two optical frequqencies $\omega_1$ and $\omega_2$ at a test object and holographically recorded by means of two reference waves of the frequencies $\omega_1$ and $\omega_2$, respectively, wherein $|\omega_1 - \omega_2| > 1$ GHz., which comprises:

providing during recording at said hologram two spatially separate reference waves inclined to said wave field scattered at said object and impinging on a holographic recording medium, wherein the reference waves for reconstructing said wave fields are oriented with respect to said recording medium identically to their spatial orientation during said recording process and are of frequencies $\omega_1'$ and $\omega_2'$, respectively, and wherein the difference between $\omega_1'$ and $\omega_2'$ is between zero and 1 GHz.;

focusing the reconstructed wave fields in an image plane using geometric-optical means; and scanning with optoelectronic detector means said image plane to evaluate the fluctuating light signal and its phase in said image plane.

5. The method for evaluating the reconstruction of holographically recorded wave fields according to claim 4, further comprising:

providing in the recording process an illuminating beam containing the frequencies $\omega_1$ and $\omega_2$ which impinges on said object; and providing two reference waves of said frequencies $\omega_1$ and $\omega_2$, respectively, inclined to the wave field scattered at said object and inclined to each other.

6. The method for evaluating the reconstruction of holographically recorded wave fields according to claim 4, further comprising:

providing during said recording process two collinear illuminating beams containing the frequencies $\omega_1$ and $\omega_2$ for impinging on said object;

providing first and second holographic recording mediums disposed one behind the other in the direction of observation; and providing said two reference waves parallel to one another and inclined to the wave field scattered at the object, each of said reference waves impinging on one of said mediums.

* * * * *